July 10, 1962 G. O. BUTLER ETAL 3,043,454
VEHICLE ELEVATING MECHANISM
Filed Nov. 13, 1959 5 Sheets-Sheet 1

Inventors
Gordon O. Butler
William H. Calvert
by Hill, Sherman, Meroni, Gross & Simpson Attys.

Inventors
Gordon O. Butler
William H. Calvert

Attys

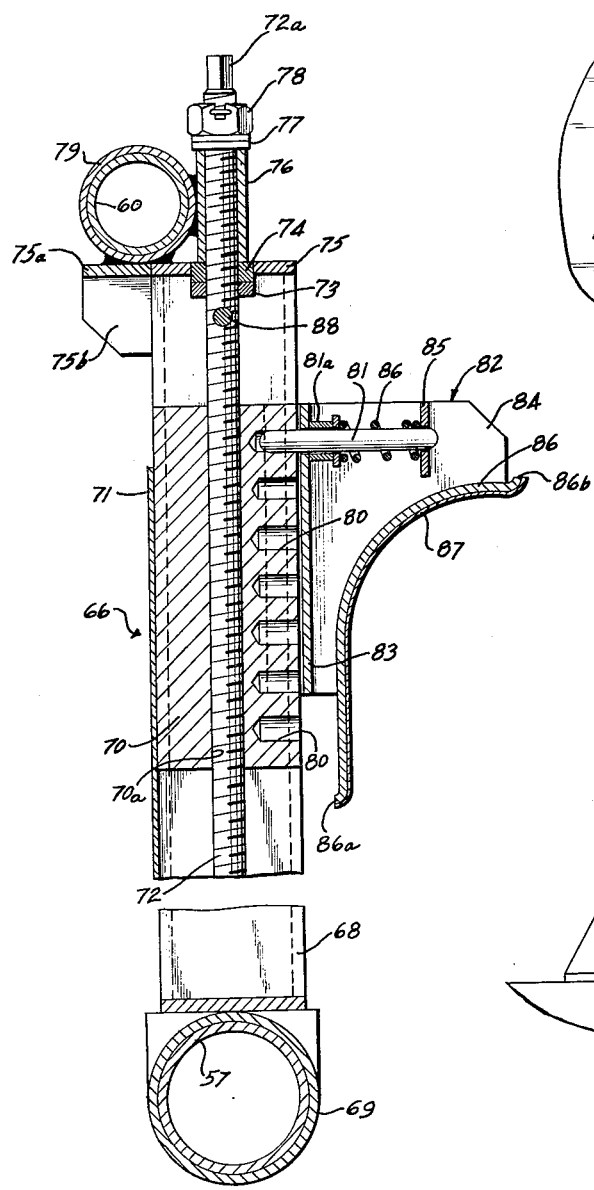
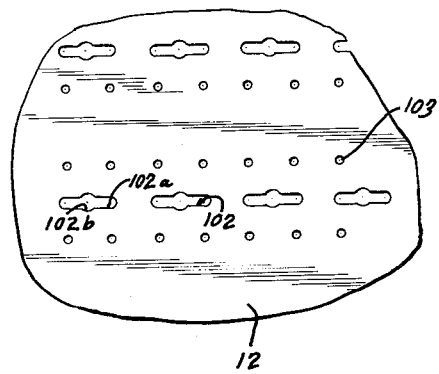
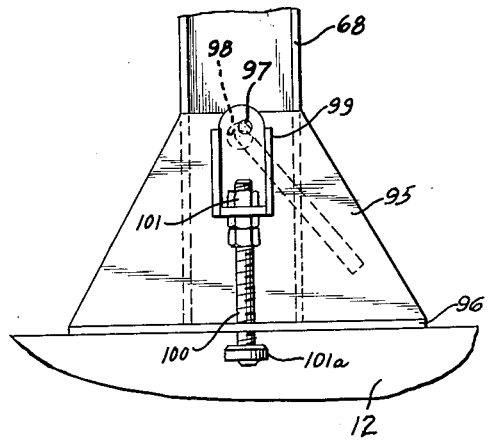

2,043,454
Patented July 10, 1962

1

3,043,454
VEHICLE ELEVATING MECHANISM
Gordon O. Butler and William H. Calvert, Oshawa, Ontario, Canada, assignors to Houdaille Industries, Inc., Buffalo, N.Y., a corporation of Michigan
Filed Nov. 13, 1959, Ser. No. 852,862
9 Claims. (Cl. 214—75)

The present invention relates broadly to the art of vehicle transportation, and is more particularly concerned with a novel technique for transporting a plurality of vehicles within an enclosed truck, railroad car or the like, and as well the instant invention is especially directed to new and improved apparatus for elevating automobiles and related vehicles within a transporting vehicle for shipment thereby.

It is known in the art to move automobiles, boats and other means of conveyance from one location to another by tractor-trailer combinations wherein the trailer portion is provided with extensible tracks for directing a second pair of automobiles to an elevated position above a first pair of automobiles seated on the trailer bed. Chain means are employed to secure the vehicles to the trailer bed, and while this method of transport is possessed of certain economic advantages, there remains by use of this same method the important disadvantage that the trailer is generally completely unproductive in its return trip. In other words, unless there is available at the destination of the truck other vehicles to be transported to the truck's point of origin or to an intermediate point, the tractor-trailer "dead heads" or returns empty. Normally this is the situation, since generally the tractor-trailer has as its point of origin an automobile assembly plant, and there is normally no occasion or reason to transport other vehicles back to the assembly plant.

It is further known to haul automobiles within a railroad box car; however, the disadvantage here is that the freight costs are often generally higher than the truck rate for the same distance. Then, too, railroad cars used for automobile transportation purposes are specially constructed and embody elevating devices therein, so that loads other than automobiles cannot be accommodated with facility, and in any event, the rate charged for such special cars is greater than the conventional box car, and accordingly, it is not economical to transport other commodities by such cars on the return trip. Further, loading of railroad box cars with automobiles is a tedious task by reason of center door loading being required.

It is accordingly an important aim of the present invention to provide novel apparatus permitting transportation of a plurality of conveyances within an enclosed transporting vehicle.

Another object of this invention lies in the provision of a method of loading automobiles and the like into an enclosed van or related vehicle, and wherein a first plurality of automobiles are advanced into the van and elevated therein followed by loading a second plurality of vehicles into a lower tier beneath the first plurality of vehicles, or alternatively, moving a first vehicle into the van, elevating said vehicle, advancing a second automobile beneath the first, followed by successively moving another vehicle into the van, elevating the same and locating a further automobile therebeneath.

Another object of the invention is to provide vehicle elevating apparatus of sturdy and reliable construction, incorporating a minimum number of parts and ready collapsibility so that the apparatus can be stored closely adjacent the roof of the transporting vehicle.

A further object of this invention lies in the provision of a method of vehicle transportation, featuring the use of vehicle elevating apparatus and means to restrain said vehicles during movement, thereby permitting automobiles and the like to be transported in an enclosed van, and further permitting said van to be loaded with other commodities for return to its point of origin.

A still further object of the present invention lies in the provision of apparatus for elevating conveyances within an enclosed transporting vehicle, and which apparatus embodies a plurality of first beam members connected to said vehicle along the upper portion thereof, a plurality of second beam members vertically movable relative to said first beam members, means connected to said beam members for supporting the conveyance in an elevated position, and means connected to said first and second beam members for raising and lowering said second beam members relative to said first beam members to elevate the conveyance within the transporting vehicle to permit another conveyance to be located therebeneath.

Other objects and advantages of the invention will become more apparent during the course of the following description, particularly when taken in connection with the accompanying drawings.

In the drawings, wherein like numerals designate like parts throughout the same:

FIGURE 5 is a vertical sectional view of an exemplary vehicle hold down means which may be employed with the elevating mechanism of this invention;

FIGURE 6 is a fragmentary side elevational view of the base structure of another form of hold down means which can be employed in connection with the instant invention; and FIGURE 7 is a fragmentary detail view of the floor of a transporting vehicle to show the slot and hole arrangement therein for receiving the base of the hold down means of FIGURE 6.

Figure 1:
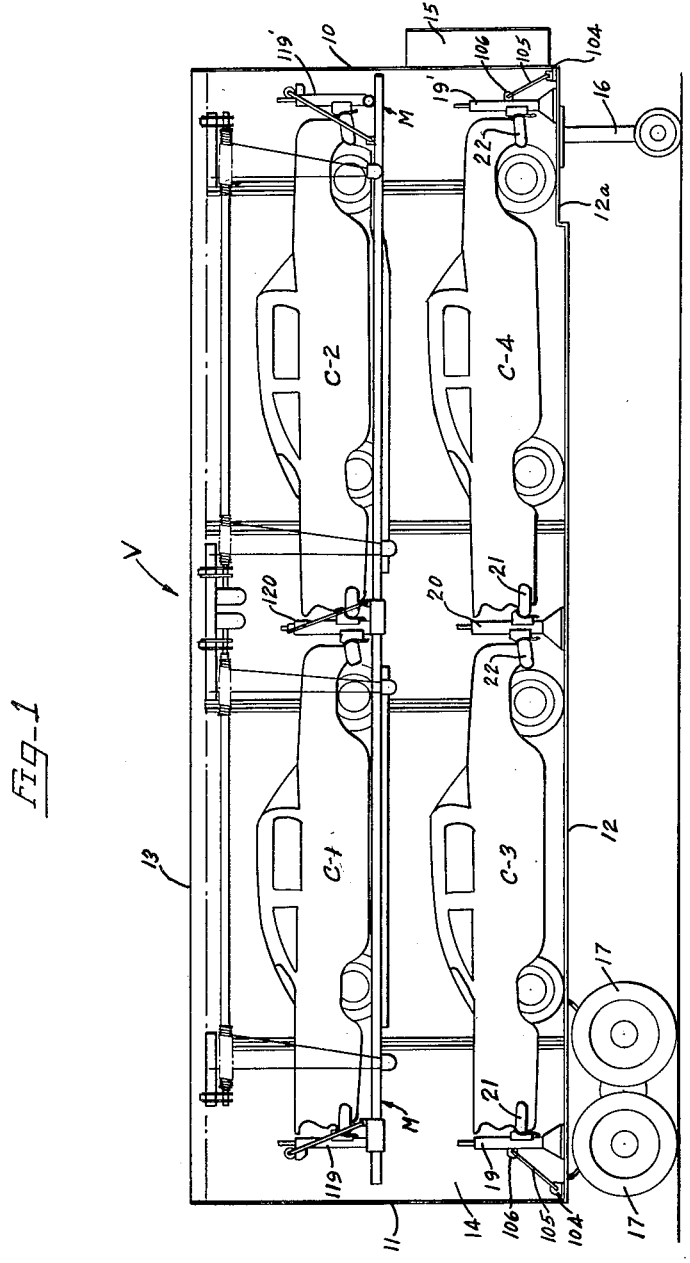
FIGURE 1 is a side elevational view of a transporting vehicle with a side panel removed, and showing an illustrative application of the elevating apparatus of this invention to raise a pair of conveyances to a vertically spaced position above another pair of conveyances supported in the transporting vehicle.

Referring now to the drawings, there is shown a transporting vehicle V which may take the form of a truck van having front and rear end panels 10 and 11, a floor 12, top wall 13 and a pair of side panels 14, one of which has been removed to facilitate illustration. The front end wall may have an access door 15 to facilitate loading, while the rear end panel 11 would normally take the form of a pair of doors opening to the entire width of the van. During loading the front of the van may be supported by a swingable strut and front wheel structure 16, whereas the conventional rear wheel structure 17 is employed. The transporting vehicle V is illustratively indicated as a van or truck trailer, although it will be quite apparent that the instant invention is of equal application to railroad box cars and other vehicles of transport. However, and as will also be quite apparent, a van provided with the apparatus of this invention has the advantage of use in "piggy-back" service, and one particular and illustrative application demonstrated by practice to have numerous advantages is the transportation of automobiles from an industrial center to a farming area, and on the return trip, the transportation of wheat or other grain to a metropolitan area or to an intermediate point. As is now quite clear, there is avoided by this invention "dead heading," or a loss in revenue from the transporting vehicle on its return trip.

Briefly stated, and as is more or less diagrammatically shown in FIGURE 1, a van V equipped in accordance with this invention accommodates a plurality of conveyances C1–4, four of which are shown with the conveyances C–2 and C–4 generally vertically aligned and spaced one from another in general manner of the conveyances C–1 and C–3. It may be noted that the conveyances C–3 and C–4 are supported by the floor or bottom wall 12 of the van, and are restrained during movement against vertical and horizontal travel by hold down means 19—19' and 20, the latter numeral identifying a dual-functioning hold down device exerting a restraining force on rear bumper 21 of vehicle C–4 and upon front bumper 22 of the lower rear vehicle C–3. The hold down means 19—19' have common structural features, to be later described, and it may be observed that the hold down means 19 is in contact with rear bumper 21 of conveyance or automobile C–3, whereas the hold down means 19' effectively prevents vertical and horizontal movement of the front end of the vehicle C–4 by contact with the front bumper 22 thereof. There is illustrated in FIGURE 1, and will be later described particularly in connection with FIGURE 5, one form of mold down means 19—19' and 20 which work to date have proven to be particularly effective, however, the structural details of the hold down means form no part of the instant invention, and other means may be employed to restrain the vehicles being transported, without departures being made from the novel concepts of this invention.

In order to provide the advantageous results herein disclosed, the transporting vehicle V embodies elevating mechanism generally designated by the legend M, shown in FIGURE 1 as being a unitary structure in the sense that the automobiles or conveyances C–1 and C–2 are raised or lowered in unison. However, as the description will later bring out, the vehicles to be moved vertically may be handled separately, and in this event, the transporting vehicle V could be either first fully loaded at the front, or the vehicles to be elevated placed first in position followed by loading of the lower or floor vehicles.

Figure 2:
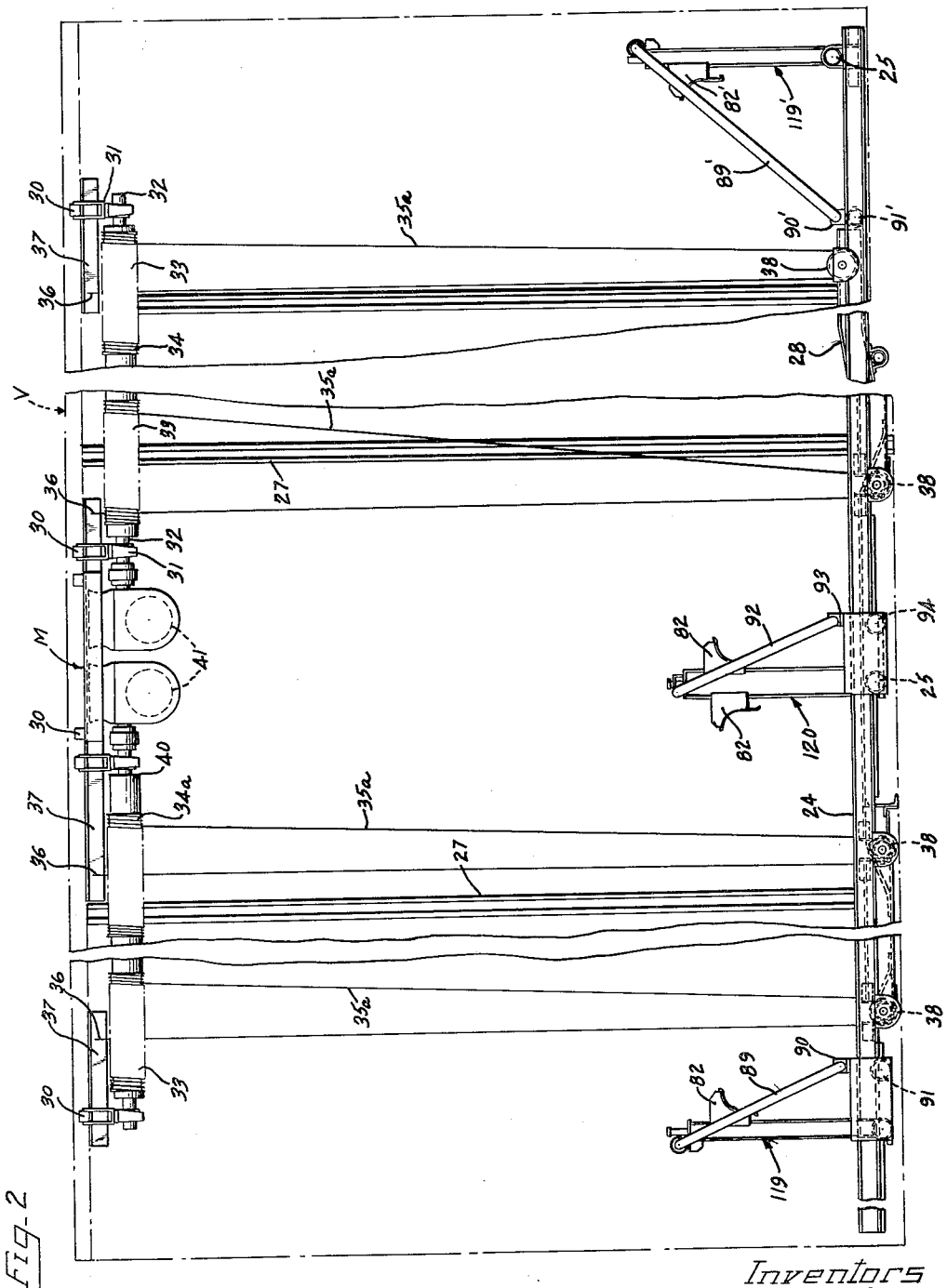
FIGURE 2 is a side elevational view, with parts broken away, illustrative of one form of elevating mechanism constructed in accordance with the principles of this invention.
Figure 3:
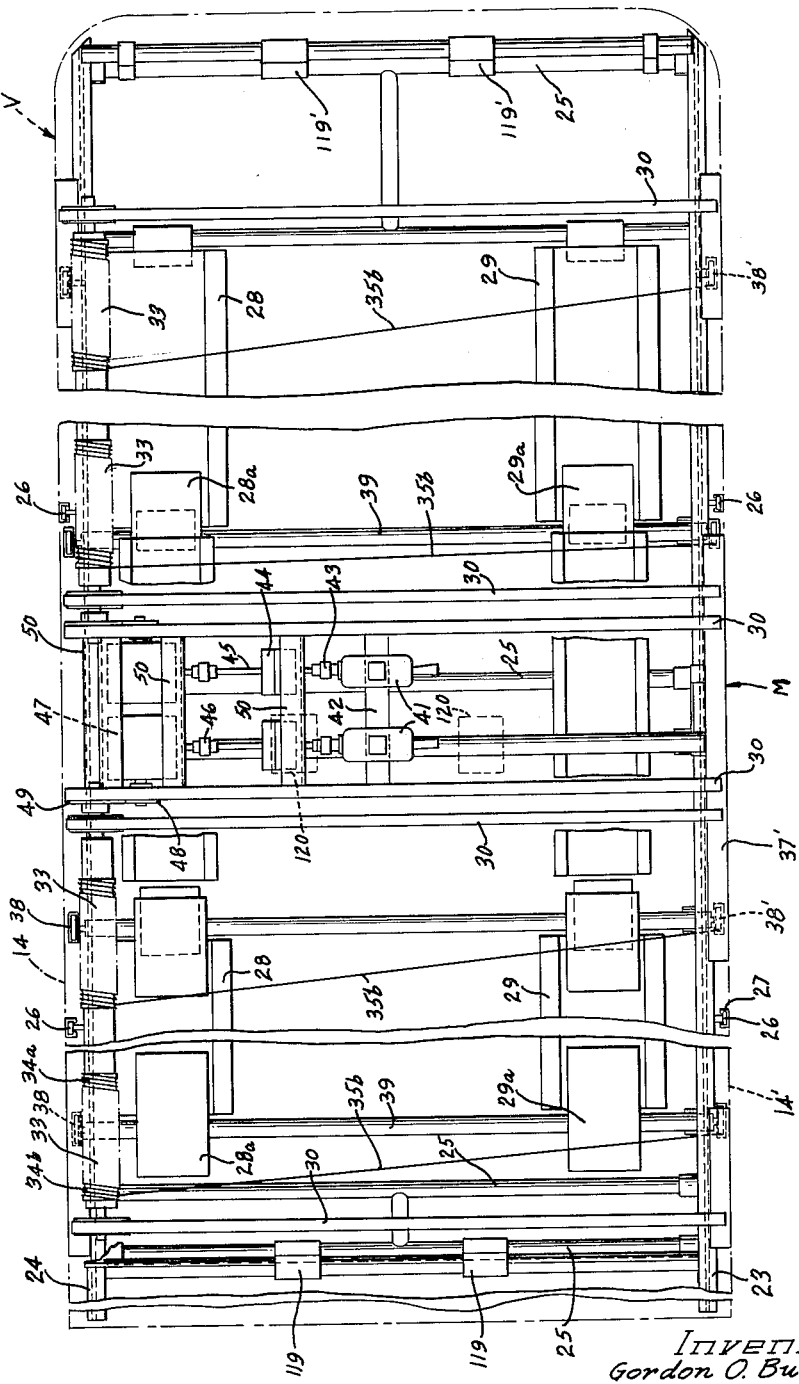
FIGURE 3 is a top plan view, with parts broken away, of the elevating mechanism of FIGURE 2.

Referring now to FIGURES 2 and 3, the elevating mechanism M of this invention comprises a pair of longitudinally extending spaced beam or supporting members 23 and 24 and extending thereacross for bracing purposes are a plurality of longitudinally spaced brace members 25, the longitudinal beam members 23 and 24 supporting at spaced locations thereon roller means 26 received in tracks 27 on opposed side walls 14 and 14' of the van V to guide the lower framework during vertical ascent and descent.

The beam members 23 and 24 may be seen from FIGURES 2 and 3 to extend essentially entirely along the length of the transporting vehicle V, and to directly receive, support and guide the conveyances or automobiles C–1 and C–2 there extends in generally parallel relation with the beam members 23 and 24 a pair of transversely spaced tracks 28 and 29 provided with overlapping connecting sections 28a and 29a, the track structure being secured in any suitable manner to the transverse braces 25 or by other means to the beam members 23 and 24. As appears in FIGURES 1 and 2, the vehicular tracks 28 and 29, and particularly the connecting portions 28a and 29a thereof, are inclined or sloped to provide wells receiving the automobile wheels.

Secured adjacent the roof or top wall 13 of the transporting vehicle V is a plurality of longitudinally spaced and transversely extending support members 30 which support longitudinally spaced bracket means 31 receiving shaft portions 32 of a pair of drum members 33—33', which may be grooved as at 34 to receive cable means 35.

It is to be seen that two cable runs 35a (FIGURE 2) and 35b (FIGURE 3) are wound about each drum 33, the run 35a being received in the grooved portion 34a on each drum 33, and the cable 35b being wrapped about the grooved portion 34b on each drum. Each cable run 35a is attached at one end to fixed structure, as for example at point 36 to angle members 37 secured to side wall 14 of the transporting vehicle V. The cable run 35a then proceeds downwardly and is wrapped about pulley or roller means 38 supported at one end of tubular cross members 39, the cable run 35a then proceeding upwardly to the grooved portion 34a on the drums 33. The cable runs 35b, on the other hand, are wrapped about the drum grooved portion 34b and proceed therefrom across and generally adjacent to the van top wall 13, being wrapped about pulley means (not shown) adjacent the van roof and then passing downwardly adjacent the van side wall 14' to be trained about pulley or roller means 38' and thereafter fixed to stationary structure, such as to angle members 37' located generally adjacent the juncture of the van top wall 13 and side wall 14'. It is thus to be seen that the lower framework is raised or lowered as eight locations therealong by the drum, cable and pulley arrangement described. In the drawings the drums 33 are shown as larger diameter portions adjacent opposite ends of intermediate diameter roller means 40, although of course this structure can be varied, and as well, the cable means 35a and 35b may be differently arranged without departure from this invention.

The motive means for rotating the drums 33 to raise and lower the beam members 23 and 24 and other portions of the lower framework may likewise take various forms, and exemplary means may comprise a pair of motor means 41 supported by brace means 42 connected to a pair of transverse members 30. The motor means 41 attach through coupler means 43 to brake means 44, and shaft means 45 from said brake means 44 connects through coupler means 46 to reduction gear boxes 47. The gear boxes 47 each mount a gear 48 in meshing relation with a gear 49 connected to shaft portion 32 on the drums 33. To support the described elements of the motive means, additional braces 50 may be employed.

Figure 4:
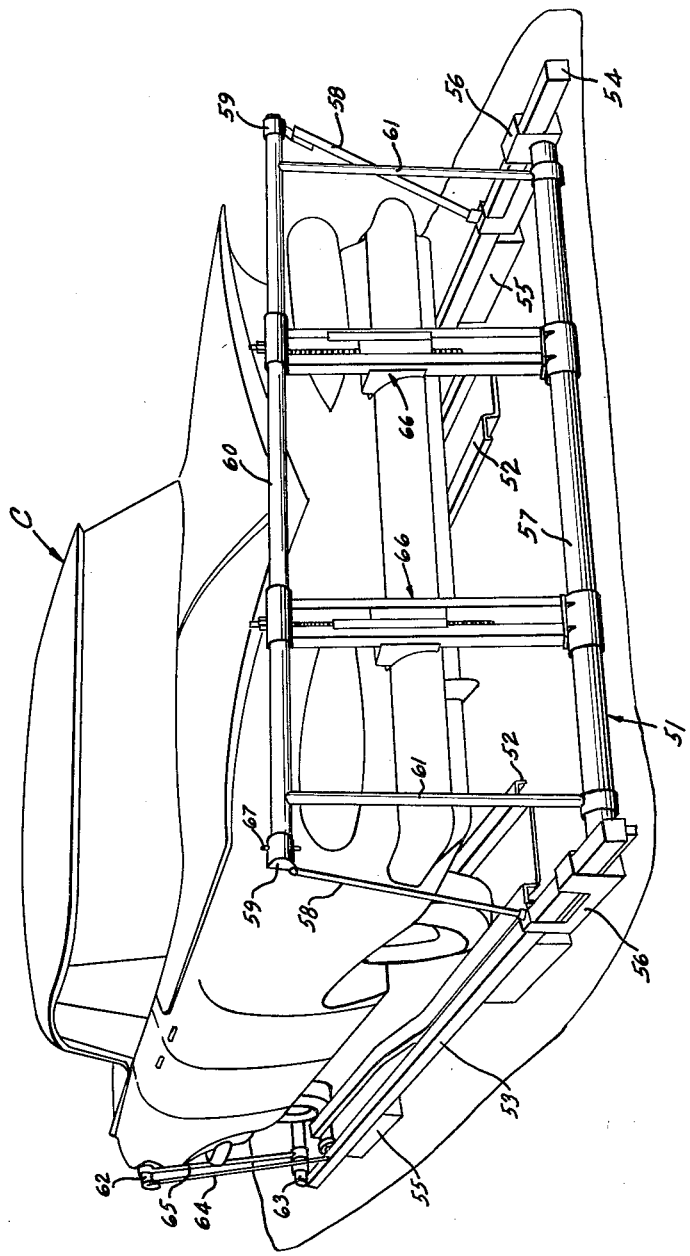
FIGURE 4 is a perspective view of another form of elevating mechanism, shown in association with a conveyance and means for restraining the same during movement.

As was stated earlier, in substitution for the unitary lower framework of FIGURES 1, 2 and 3 there may be substituted a structure wherein the conveyances C–1 and C–2 are raised and lowered individually. This is illustrated in FIGURE 4, wherein the framework is designated generally by the numeral 51. The framework may comprise track structure 52 and a pair of longitudinally extending members 53 and 54 mounting elevating blocks 55 and slidably receiving bracket means 56 at one end thereof. Connecting with the bracket means 56 is a transversely extending lower tubular member 57 and a pair of angularly disposed brace members 58 secured by cap means or the like 59 to an upper transversely extending tubular member 60. To rigidify the described end section of the framework 51, a pair of generally upright braces 61 may connect the tubular members 57 and 60.

The front portion of the framework 51 may be generally similar to the described rear portion, and may comprise a pair of upper and lower tubular members 62 and 63, respectively, braced as at 64 and 65. The rear portion of the framework 51 supports hold down means 66, to be later described in detail, and said rear portion may be swung rearwardly to lie generally flat with the support members 53 and 54 by removing pin means or the like 67 from the cap means 59 and upper tubular member 60, permitting the cap means to be slid from the tubular member 60 and the rear portion of the framework to be swung rearwardly and downwardly. A generally similar disassembly may be employed at the front portion of the framework 51. As is apparent, the longitudinally extending members 53 and 54 would mount roller or pulley means (not shown) to receive the cable means 35a and 35b in the manner earlier described.

It has also been earlier stated that the hold down means 19—19' and 20 restrain the vehicles being transported against vertical and horizontal movements. A specific form of hold down means which experience has demonstrated produces effective results is shown in FIGURE 5 and is designated therein generally by the numeral 66. However, insofar as the specific structural details of the hold down means are concerned, the elements of the hold down means 66 now to be described are common to the hold down means 19—19' and 20 of FIGURES 1, 2 and 3.

The hold down means 66 comprises a pair of spaced channel members 68, one only of which is shown, erected from a collar member 69 received about the lower tubular member 57. The channel members 68 define therebetween a slideway for a slidable member 70, the vertical travel of which is confined by a plate 71 suitably attached to the channel members 68. The slidable member 70 may take the form of a block, and said block is centrally bored as at 70a to receive a threaded rod 72 providing vertical travel for the slidable member 70.

The threaded rod 72 has secured thereto adjacent its upper end a collar 73, and bearing against said collar is a thrust washer 74 seated in plate means 75 provided with a shelf portion 75a having a flange 75b formed thereon. The threaded rod 72 further mounts a tubular collar 76, washer means 77 and nut means 78. The upper end of the threaded rod 72 may have formed thereon a wrench or handle engaging portion 72a. The tubular collar 76 by welding or other techniques connects with a tubular collar 79 received about the upper tubular member 60 of the framework 51, or when the hold down means are employed with the elevating mechanism M of FIGURES 1, 2 and 3, the tubular member 60 would not be utilized, and in lieu thereof, a transversely extending rod or bar member (not shown) can be employed to further rigidify a pair of hold down means. Of course, when the hold down means are employed in connection with the lower conveyances C-3 and C-4, the tubular members 60 and 79 are omitted.

The slidable block 70 is provided along one face thereof with a plurality of vertically aligned recesses or holes 80, and receivable in said recesses is a plunger member 81 of bumper engaging means generally designated at 82. The bumper engaging means 82 further comprises a plate member 83 in general face to face relationship with the upright channel members 68, and if desired the plate member 83 may be formed with inwardly turned flange portions (not shown) engageable with the channel member 68 to guide the bumper engaging means 82 during vertical movement. Forming a further part of the bumper engaging means 82 is a pair of spaced plates 84, one only of which is shown, and connected thereto is a plunger receiving portion 85 bottoming one end of spring means 86, which bottoms at its opposite end against a collar portion 81a on the plunger member 81. The plate members 84 connect with a smoothly contoured bumper engaging face plate 86, the exposed face of which may carry a coating 87 of rubber, resin or the like to prevent scratching of the vehicle bumpers 21 and 22. The bumper engaging member 86 is of course contoured to the curvature of the bumpers 21 and 22, and as is best shown in FIGURE 5, the member 86 is generally arcuate and may be turned inwardly as at 86a and upwardly as at 86b.

It may now be seen that by loosening the nut means 78 and applying a rotative force to the threaded rod 72 by means of the wrench or handle engaging portion 72a, the slidable member 70 is raised or lowered to a desired position of vertical adjustment. To lock the threaded rod 72 and slidable member 70 in a particular position, locking means may be provided engageable with the threaded rod 72 and the channel members 68. As the specific form of locking means, as well as the hold down means itself form no part of the instant invention, locking means are generally shown in FIGURE 5 as a plunger 88 receivable in a suitable aperture in the threaded rod 72. Of course, the plunger 88 would normally be resiliently urged into engagement with the threaded rod 72, and would be slidable relative to the channel member 68, or if desired, relative to suitable flange portions on the plate means 75.

The hold down means employed with the elevating mechanism M of FIGURES 1, 2 and 3 are identified therein by the numerals 119—119' and 120. The hold down in by the numerals 119—119' may be seen to be mounted by transverse rod members 25 at opposite ends of the beam members 23 and 24, and the specific mounting arrangement may include tubular collars received about the transverse pipe members 25 in the manner of the framework 51 of FIGURE 4. To rigidify the hold down means 119 and 119' angle braces 89 and 89' are utilized, as shown in FIGURE 2, and said braces may connect to bracket means 90 and 90' at opposite ends of the lower framework, said bracket means if desired being mounted by transversely extending brace members 91 and 91'.

The hold down means 120 may be seen to restrain both the rear vehicle C-1 and front vehicle C-2 against vertical and horizontal movement, and for this purpose is provided with oppositely facing bumper engaging portions 82, preferably constructed in the manner of FIGURE 5, and departing therefrom only in the sense that the opposite face of the slidable member 70 is apertured to coact with the other bumper engaging member 82. The central hold down means 120 may be mounted by a transverse rod member 25, and may be braced at 92 through means 93 connecting to a transverse rod member 94 extending between the longitudinal beam members 23 and 24.

The hold down means 19—19' and 20 functioning with the lower tier of vehicles C-3 and C-4 are constructed generally in the manner of the hold down means earlier described, the main departure therefrom being a modified base portion which cooperates with the floor or bottom wall 12 of the transporting vehicle V. This is more fully illustrated in FIGURES 6 and 7, to which reference is now made. As shown in FIGURE 6, the channel members 68 at opposite sides thereof support angle bracket means 94 either integral with or attaching to a base plate 96. The channel members 68 are apertured to receive a rod member 97 having eccentric portions (not shown) formed thereon at opposite ends received in shaped slots 98 in a pair of bracket members 99, one of which is disposed adjacent each of the generally triangularly shaped plates 95. The bracket means 99 each support bolt means 100 attached thereto by nut means 101, and mounting at their opposite ends a collar portion 101a to be received in the floor 12 of the transporting vehicle V.

The floor of the vehicle may take the form of a plate of the character shown in FIGURE 7, and formed therein is a plurality of longitudinally spaced slots 102, each having a relatively narrow slot portion 102a and a relatively wider central slot portion 102b. The floor 12 of the transporting vehicle V may further be formed with a plurality of holes or openings 103, and these are provided to receive bracket means 104 (FIGURE 1) connecting with brace means 105 attaching with ear portions 106 on the hold down means 19—19'. Of course, the central hold down means 20 may attach to the floor 12 in the manner described in connection with FIGURES 6 and 7.

During loading of the transporting vehicle the elevating mechanism M is lowered by the described motive means to a position upon the floor 12 of the vehicle V. The brace means 89 and 89' on the hold down means 119 and 119', as well as the brace means 92 for the central hold down means 120, are detachable to permit the hold down means to be swung downwardly whereby said hold down means are generally within the horizontal profile of the lower framework. The conveyances or automobiles C-2 and C-1 are then driven onto the track structure 28 and 29, the hold down means placed in restraining contact with the bumpers 21 and 22 in a manner now believed quite apparent, and the elevating mechanism M raised to the position shown in FIGURE 1 under action of the motive means, cable means 35a and 35b and pulley means in the manner earlier described.

The front hold down means 19' is then raised and braced, the front and lower vehicle C-4 driven into the transporting vehicle V and into contact with the bumper engaging portion of the hold down means, and the central hold down means 20 is then erected and the bumper engaging portion adjusted to contact the rear bumper 21 on the front automobile C-4. The lower and rear automobile C-3 is then driven into the van, the rearwardly facing bumper engaging portion on the central hold down means 20 adjusted to engage the front bumper 22 of the automobile C-3, the rear hold down means 19 erected, braced and the bumper engaging portion properly adjusted to the height and contour of the rear bumper 21 of the rear automobile C-3. The loading and elevating operation is then essentially complete, however, if further adjustments of the front hold down means 19' is required, access may be had thereto through the front door 15. As shown in FIGURE 1, the floor 12 of the transporting vehicle V may have a raised forward portion 12a to permit slight elevation of the front automobile C-4.

It has been noted that the hold down means shown and described can be replaced by other means to restrain the conveyances during transport, and other modifications have been noted during the course of the preceding description. Such variations and modifications may, of course be effected without departing from the novel concepts of the instant invention.

We claim as our invention:

1. Apparatus for elevating conveyances within an enclosed vehicle, comprising a plurality of first beam members connected to said vehicle along the upper portion and extending essentially entirely along the length thereof, a plurality of second beam members of generally the same length as the first beam members and vertically movable relative to said first beam members, means connected to said second beam members for supporting the conveyance in an elevated position, means interiorly of the vehicle and connected to said first and second beam members for raising and lowering said second beam members relative to said first beam members to elevate the conveyance within the transporting vehicle to permit another conveyance to be moved into the vehicle and located beneath the conveyance, and hold down means vertically and horizontally adjustable with respect to said second beam members for restraining the conveyance against vertical and horizontal movement during raising and lowering of the second beam members and also during travel of the vehicle.

2. Apparatus for elevating conveyances within an enclosed end loading transporting vehicle having essentially uninterrupted side walls, comprising a framework to be located at either of opposite ends of the vehicle closely adjacent the side walls thereof for supporting a conveyance during vertical movement within the vehicle, winch means positioned adjacent the upper portion of said vehicle, cable means connected to said winch means and to said framework, drive means for said winch means for raising and lowering said framework to elevate the conveyance within the transporting vehicle to permit another conveyance to be located therebeneath, and hold down means vertically and horizontally adjustable with respect to said framework and connected to said framework for restraining the conveyance against vertical and horizontal movement during raising and lowering of the framework and also during travel of the vehicle.

3. Apparatus for elevating conveyances within an enclosed end-loading transporting vehicle, comprising a framework for supporting a conveyance during vertical movement within the vehicle, hold down means on said framework bearing against said conveyance at opposite ends thereof during vertical movement of the framework to additionally restrain the conveyance against vertical and horizontal movement during travel of the transporting vehicle, said hold down means being vertically and horizontally adjustable with respect to said framework, winch means positioned adjacent the upper portion of said vehicle, cable means connected to said winch means and to said framework, and drive means for said winch means for raising and lowering said framework to elevate the conveyance within the transporting vehicle to permit another conveyance to be located therebeneath.

4. Apparatus for elevating conveyances within an enclosed end-loading transporting vehicle having essentially uninterrupted side walls, comprising a substantially flat framework extending generally entirely along the length of the transporting vehicle and vertically movable in close adjacency to the vehicle side walls essentially entirely therealong for supporting a plurality of conveyances, hold down means on said framework vertically and horizontally adjustable relative to said framework and for each of said plurality of conveyances to restrain the conveyances against vertical and horizontal movement during travel of the transporting vehicle, winch means positioned adjacent the upper portion of said vehicle, cable means connected to said winch means and to said framework at a plurality of locations on opposite sides thereof, and drive means for said winch means for raising and lowering said framework to elevate the conveyance within the transporting vehicle to permit another conveyance to be located therebeneath, said framework being of sufficiently low vertical profile to permit storage adjacent the roof of the transporting vehicle essentially entirely therealong, whereby said vehicle may be additionally employed for transporting grain and the like on return trips of said vehicle.

5. Apparatus for elevating conveyances within an enclosed end-loading transporting vehicle, comprising a framework for supporting a conveyance thereon and vertically movable in close adjacency to the vehicle side walls at opposite ends of the vehicle, guide means on opposite side walls of the transporting vehicle, means on opposite side walls of said framework engageable with said guide means to guide said framework during vertical movement in close adjacency to the vehicle side walls, winch means positioned adjacent the upper portion of said vehicle, cable means connected to said winch means and to said framework, and drive means for said winch means for raising and lowering said framework to elevate the conveyance within the transporting vehicle to permit another conveyance to be located therebeneath, and hold down means on said framework vertically and horizontally adjustable relative to the framework for bearing engagement with the conveyance to restrain the conveyance against movement relative to the framework said framework being of sufficiently low vertical profile to permit storage adjacent the roof of the transpotring vehicle, whereby said vehicle may be additionally employed for transporting grain and the like on return trips of said vehicle.

6. Apparatus for elevating conveyances within an enclosed end-loading transporting vehicle having essentially uninterrupted side walls, comprising a plurality of longitudinally extending beam members and vertically movable in close adjacency to the vehicle side walls essentially entirely therealong, a plurality of transversely extending bracing members connected to said beam members, track means extending generally parallel to said beam members to receive the wheels of a conveyance for supporting said conveyance in an elevated position within said transporting vehicle, roller means connected to said beam members, winch means positioned adjacent the upper portion of said vehicle, cable means connected to said winch means and trained about said roller means, and drive means for said winch means for raising and lowering said beam members, roller means, bracing members, track means and conveyance thereon to elevate the conveyance within the transporting vehicle to permit another conveyance to be located therebeneath, and hold down means vertically and horizontally adjustable relative to said beam means and secured to the beam means to secure the conveyance against unrestrained movement, said beam members, bracing members and track means providing a sufficiently low vertical profile to permit storage adjacent the roof of the transporting vehicle, whereby said vehicle may be additionally employed for transporting grain and the like on return trips of said vehicle.

7. Apparatus for elevating conveyances within an enclosed end-loading transporting vehicle having essentially uninterrupted side walls comprising a plurality of longitudinally extending beam members and vertically movable in close adjacency to the vehicle side walls essentially entirely therealong, a plurality of transversely extending bracing members connected to said beam members, track means extending generally parallel to said beam members to receive the wheels of a conveyance for supporting said conveyance in an elevated position within said transporting vehicle, roller means connected to said beam members, bracket means connected to said vehicle adjacent the roof thereof, drum means supported for rotation by said bracket means, cable means connected to said drum means and trained about said said roller means, motor means supported adajcent the roof of the vehicle for driving said drum means in rotation for raising and lowering said beam members, roller means, bracing members, track means and conveyance thereon to elevate the conveyance within the transporting vehicle to permit another conveyance to be located therebeneath, and hold down means vertically and horizontally adjustable relative to said beam means and secured to the beam means to secure the conveyance against unrestrained movement, said beam members, bracing members and track means providing a sufficiently low vertical profile to permit storage adjacent the roof of the transporting vehicle, whereby said vehicle may be additionally employed for transporting grain and the like on return trips of said vehicle.

8. Apparatus for elevating conveyances within an enclosed end-loading transporting vehicle, comprising a plurality of longitudinally extending beam members, a plurality of transversely extending bracing members connected to said beam members, track means extending generally parallel to said beam members to receive the wheels of a conveyance for supporting said conveyance in an elevated position within said transporting vehicle, roller means connected to said beam members, collapsible means connected to said bracing members and directly engageable with opposite ends of the conveyances during vertical movement of the conveyance to additionally restrain said conveyances vertical and horizontal movement during travel of the transporting vehicle, guide means on opposite side walls of the transporting vehicle, rotatable means on said beam members engageable with said guide means to guide said beam members during vertical movement, bracket means connected to said vehicle adjacent the roof thereof, drum means supported for rotation by said bracket means, cable means connected to said drum means and trained about said roller means, motor means supported adjacent the roof of the vehicle for driving said drum means in rotation for raising and lowering said beam members, roller means, bracing members, track means and conveyance thereon to elevate the conveyance within the transporting vehicle to permit another conveyance to be located therebeneath, said collapsible means when collapsed, and said beam members, bracing members and track means providing a sufficiently low vertical profile to permit storage adjacent the roof of the transporting vehicle, whereby said vehicle may be additionally employed for transporting grain and the like on return trips of said vehicle.

9. In an enclosed end-loading transporting vehicle, the improvement which comprises a mechanism for elevating and supporting conveyances within said vehicle; said mechanism comprising a framework extending essentially entirely throughout the length of the vehicle for supporting a conveyance during vertical movement within the vehicle, winch means positioned adjacent the upper portion of said vehicle, cable means connected to said winch means and to said framework, and drive means for said winch means for raising and lowering said framework to elevate a conveynce for transport within said vehicle; and hold down means on said framework and on the floor of said vehicle directly contacting opposite ends of the conveyances to restrain said conveyances against vertical and horizontal movement during travel of the transporting vehicle, said hold down means on said framework being vertically and horizontally adjustable relative to said framework, said hold down means on said framework being engageable with oppoiste ends of the conveyance prior to elevation of the framework, said framework being of suffiicently low vertical profile to permit storage adjacent the roof of the transporting vehicle, whereby said vehicle may be additionally employed for transporting grain and the like on return trips of said vehicle.

References Cited in the file of this patent

UNITED STATES PATENTS

| | | |
|---|---|---|
| 1,994,695 | Dolan et al. | Mar. 19, 1935 |
| 2,432,228 | De Lano | Dec. 9, 1947 |
| 2,659,318 | Steins et al. | Nov. 17, 1953 |